(12) United States Patent
Molter et al.

(10) Patent No.: US 6,828,056 B2
(45) Date of Patent: Dec. 7, 2004

(54) ELECTRODE CATALYST COMPOSITION, ELECTRODE, AND MEMBRANE ELECTRODE ASSEMBLY FOR ELECTROCHEMICAL CELLS

(75) Inventors: Trent M. Molter, Glastonbury, CT (US); Jason K. Shiepe, Middletown, CT (US); A. John Speranza, West Hartford, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 269 days.

(21) Appl. No.: 09/965,617

(22) Filed: Sep. 27, 2001

(65) Prior Publication Data

US 2004/0224215 A1 Nov. 11, 2004

Related U.S. Application Data

(60) Provisional application No. 60/235,817, filed on Sep. 27, 2000, and provisional application No. 60/235,819, filed on Sep. 27, 2000.

(51) Int. Cl.$^7$ ................................................. H01M 8/10
(52) U.S. Cl. ............................ 429/44; 429/34; 429/38; 429/39; 429/40; 429/42; 204/290
(58) Field of Search ............................. 429/30, 34, 35, 429/36, 37, 38, 39, 41, 42, 44, 33, 231.8; 204/290, 284, 283

(56) References Cited

U.S. PATENT DOCUMENTS

| | | | |
|---|---|---|---|
| 3,935,029 A | 1/1976 | Baker et al. ................ 136/121 |
| 3,992,271 A | 11/1976 | Danzig et al. .............. 204/129 |
| 4,250,231 A | 2/1981 | Maru .......................... 429/13 |
| 4,670,146 A | 6/1987 | Inoue et al. ................ 210/490 |
| 4,752,370 A | 6/1988 | McMichael et al. ........ 204/283 |
| 4,795,684 A | 1/1989 | Jalan et al. .................. 429/44 |
| 5,035,962 A | 7/1991 | Jensen ......................... 429/40 |
| 5,164,060 A | 11/1992 | Eisman et al. .............. 204/282 |
| 5,225,391 A | 7/1993 | Stonehart et al. ........... 502/324 |
| 5,227,042 A | 7/1993 | Zawodzinski et al. ...... 204/403 |
| 5,234,777 A | 8/1993 | Wilson ........................ 429/33 |
| 5,246,791 A | 9/1993 | Fisher et al. ................. 429/16 |
| 5,286,580 A | 2/1994 | Ippommatsu et al. ........ 429/40 |
| 5,409,785 A | 4/1995 | Nakano et al. ............... 429/33 |
| 5,432,023 A | 7/1995 | Yamada et al. .............. 429/34 |
| 5,468,574 A | 11/1995 | Ehrenberg et al. ........... 429/33 |
| 5,470,448 A | 11/1995 | Molter et al. ............... 204/252 |
| 5,500,307 A | 3/1996 | Anzai et al. ................. 429/30 |
| 5,543,239 A | 8/1996 | Virkar et al. ................ 429/33 |
| 5,547,911 A | 8/1996 | Grot ........................... 502/101 |
| 5,558,948 A | 9/1996 | Doyon ........................ 429/40 |
| 5,599,614 A | 2/1997 | Bahar et al. ................ 442/171 |

(List continued on next page.)

FOREIGN PATENT DOCUMENTS

| | | |
|---|---|---|
| EP | 0606051 A1 | 7/1994 |
| EP | 0797265 A2 | 9/1997 |
| FR | 2667728 | 4/1992 |
| GB | 1252463 | 11/1971 |
| WO | WO 99/16546 | 4/1999 |
| WO | WO 00/79628 A1 | 12/2000 |

OTHER PUBLICATIONS

International Search Report; International Application No. PCT/US 01/30255; International Filing Date: Sep. 27, 2001; 8 pages.

Primary Examiner—Frankie L. Stinson
Assistant Examiner—Monique Wills
(74) Attorney, Agent, or Firm—Cantor Colburn LLP

(57) ABSTRACT

An electrode composition comprises a support material that is non-oxidizable at anodic potentials less than about 4 volts, and a catalyst material comprising active electrocatalytic sites. In another embodiment, the electrode can further comprise a proton conductive material disposed on the support and catalyst materials.

13 Claims, 2 Drawing Sheets

U.S. PATENT DOCUMENTS

| | | | |
|---|---|---|---|
| 5,635,041 A | 6/1997 | Bahar et al. | 204/282 |
| 5,702,838 A | 12/1997 | Yasumoto et al. | 429/40 |
| 5,709,786 A | 1/1998 | Friese et al. | 204/421 |
| 5,795,669 A | 8/1998 | Wilkinson et al. | 429/40 |
| 5,958,197 A * | 9/1999 | Allen et al. | 205/624 |
| 5,958,616 A | 9/1999 | Salinas et al. | 429/41 |
| 5,968,326 A | 10/1999 | Yelon et al. | 204/296 |
| 5,994,426 A | 11/1999 | Nezu et al. | 522/125 |
| 6,156,449 A * | 12/2000 | Zuber et al. | 429/42 |
| 6,183,898 B1 * | 2/2001 | Koschany et al. | 429/42 |
| 6,187,468 B1 * | 2/2001 | Shinkai et al. | 429/42 |
| 6,326,098 B1 | 12/2001 | Itoh et al. | 429/40 |
| 6,548,445 B1 * | 4/2003 | Buysch et al. | 502/230 |
| 2002/0098393 A1 * | 7/2002 | Dine et al. | 429/13 |
| 2002/0107140 A1 * | 8/2002 | Hampden-Smith et al. | 502/185 |

* cited by examiner

ELECTRODE CATALYST COMPOSITION, ELECTRODE, AND MEMBRANE ELECTRODE ASSEMBLY FOR ELECTROCHEMICAL CELLS

CROSS REFERENCE TO RELATED APPLICATIONS

This application claims the benefit of U.S. Provisional Patent Application Ser. No. 60/235,817 filed Sep. 27, 2000, and U.S. Provisional Patent Application Ser. No. 60/235,819, filed Sep. 27, 2000, both of which are fully incorporated herein by reference.

BACKGROUND

The disclosure relates to electrochemical cells, and more particularly, to an electrode catalyst composition, electrode, and membrane electrode assembly for use in electrochemical cells.

Electrochemical cells are energy conversion devices, usually classified as either electrolysis cells or fuel cells. A proton exchange membrane electrolysis cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of a typical anode feed electrolysis cell 100 ("cell 100"), process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104 and a first portion 108 of the process water exit cell 100, while protons 106 and a second portion 110 of process water migrate across a proton exchange membrane 118 to cathode 114 where hydrogen gas 112 is formed.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

A typical fuel cell uses the same general configuration as is shown in FIG. 1. Hydrogen gas (from a pure hydrogen source, hydrocarbon, methanol, or other hydrogen source) is introduced to the hydrogen electrode (the anode in fuel cells), while oxygen, or an oxygen-containing gas such as air, is introduced to the oxygen electrode (the cathode in fuel cells). Water can also be introduced with the feed gas. Hydrogen gas electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode can be exploited to power an external load.

In other embodiments, one or more electrochemical cells can be used within a system to both electrolyze water to produce hydrogen and oxygen, and to produce electricity by converting hydrogen and oxygen back into water as needed. Such systems are commonly referred to as regenerative fuel cell systems.

Electrochemical cell systems typically include one or more individual cells arranged in a stack, with the working fluids directed through the cells via input and output conduits formed within the stack structure. The cells within the stack are sequentially arranged, each including a cathode, a proton exchange membrane, and an anode (hereinafter "membrane electrode assembly", or "MEA"). Each cell typically further comprises a first flow field in fluid communication with the cathode and a second flow field in fluid communication with the anode. The MEA may be supported on either or both sides by screen packs or bipolar plates disposed within the flow fields, and which may be configured to facilitate membrane hydration and/or fluid movement to and from the MEA. In the alternative, or in addition to screen packs or bipolar plates, pressure pads or other compression means are often employed to provide even compressive force from within the electrochemical cell.

While existing electrodes for fuel cells or electrolysis cells are suitable for their intended purposes, there still remains a need for improvements, particularly regarding electrode catalyst compositions that oxidize under high anodic potentials. Electrodes 114, 116 (in either fuel cells or electrolysis cells) conventionally comprise a catalyst material such as a precious metal. However, in certain electrochemical cells, electrodes are provided with less catalyst loading to decrease cost. Such electrodes include a catalyst, a proton conductor such as a perfluoroionomer, and a diluent or support such as particulate carbon. The precious metal provides the active electrocatalytic site, the proton conductor provides a proton "bridge" communicating protons between the precious metal and the proton exchange membrane, and the carbon provides a high surface area for attachment of the catalyst materials and the proton conductor. U.S. Pat. No. 5,234,777 to Wilson describes a solid polymer electrolyte membrane assembly wherein a film of a proton conducting material or binder has a supported platinum catalyst dispersed therein, and where the film is bonded to the membrane. U.S. Pat. No. 5,227,042 to Zawodzinski, et al. discloses use of a carbon-supported catalyst wherein the catalyst may be composed of precious metals such as platinum. However, the carbon conventionally employed as the diluent is readily oxidizable in the electrochemical cell environment because of the high anodic potentials applied, which are generally greater than about 1.5 volts.

Accordingly, there exists a need for a non-oxidizable material to support catalyst and proton conductive materials and form an electrode for use in an electrochemical cell environment.

SUMMARY

The above-described drawbacks and disadvantages of the related art are alleviated by an electrode for use in an electrochemical cell, its methods of manufacture, a membrane electrode assembly formed thereby, and an electrochemical system employing the electrode. Based on the total weight of the electrode, the electrode comprises about 5 to about 95 wt. % of a support material that is non-oxidizable at anodic potentials of less than about 4 volts; about 5 to about 95 wt. % of a catalyst disposed on the support; and up to about 50 wt. % of a proton conductive material disposed with the catalyst.

In one embodiment, a method of manufacturing an electrode for an electrochemical cell comprises sintering, melt extruding, or casting a composition comprising a catalyst material and a support material that is non-oxidizable at anodic potentials of less than about 4 volts. A membrane electrode assembly may be formed by contacting the sintered, mixed, and extruded or cast composition with a proton conductive material.

In another embodiment, a method of manufacturing a membrane electrode assembly for an electrochemical cell comprises sintering, melt extruding, or casting a composition comprising a non-oxidizable support material, a catalyst material, and a proton conductive material.

The electrochemical cell comprises a first electrode that is non-oxidizable at anodic potentials of less than about 4 volts, wherein the electrode comprises about 5 to about 95 wt. % of a support, about 5 to about 95 wt. % of a catalyst disposed on the support, and up to about 50 wt. % of a proton conductive material disposed with the catalyst; a second electrode; and a membrane disposed between and in intimate contact with the first electrode and second electrode. An electrochemical cell system further comprises a first flow field in fluid communication with the first electrode opposite the membrane; a second flow field in fluid communication with the second electrode opposite the membrane; a water source in fluid communication with the first flow field; and hydrogen removal means in fluid communication with the second flow field.

BRIEF DESCRIPTION OF THE DRAWINGS

Referring now to the drawings, which are meant to be exemplary and not limiting, and wherein like elements are numbered alike in the several FIGURES.

DETAILED DESCRIPTION

A novel electrode for use in proton exchange membrane electrochemical cells comprises a catalyst material having active electrocatalytic sites disposed on a support material having a surface area similar to that of particulate carbon, but which, unlike particulate carbon, is non-oxidizable under electrochemical cell operating conditions. The electrode can further comprise a proton conductive material as is described in detail below.

Although the disclosure below is described in relation to a proton exchange membrane electrochemical cell employing hydrogen, oxygen, and water, other types of reactants can also be used, including, but not limited to, hydrogen, bromine, oxygen, air, chlorine, and iodine. Upon the application of different reactants, the flows and reactions change accordingly, as is commonly understood in relation to that particular type of electrochemical cell. Furthermore, while the discussion below is directed to an anode feed electrolysis cell, it should be understood by those of skill in the art that cathode feed electrolysis cells, fuel cells, and regenerative fuel cells are also within the scope of the embodiments disclosed.

Figure 1:
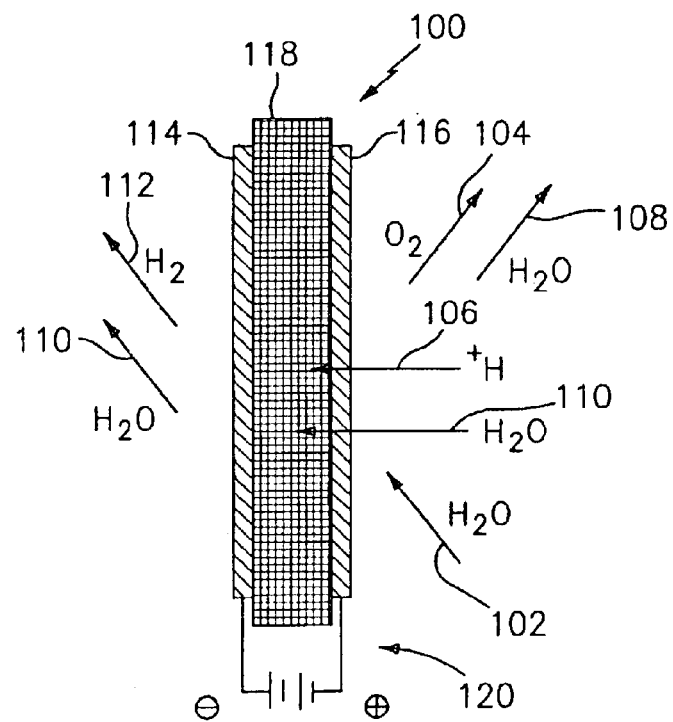
FIG. 1 is a schematic representation of an anode feed electrolysis cell of the related art.
Figure 2:
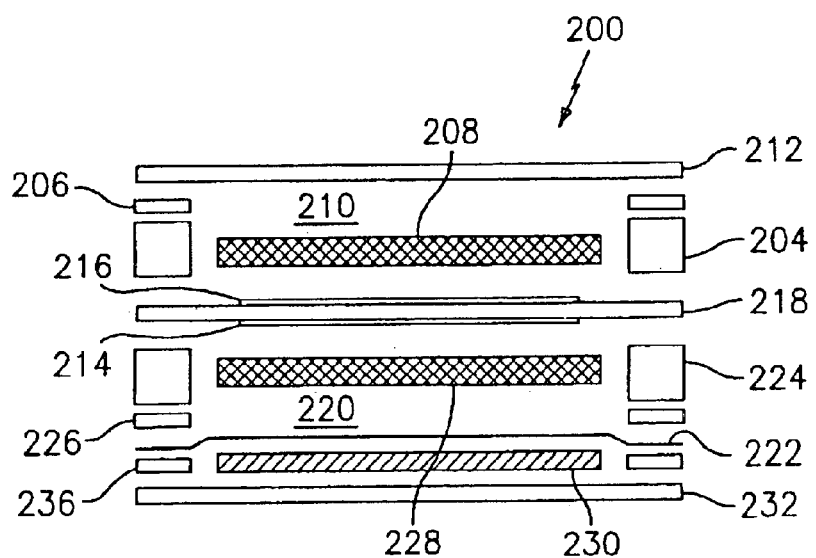
FIG. 2 is a cross sectional schematic representation of an electrochemical cell system showing the spatial relationship of the cell components.

Referring to FIG. 2, an exemplary embodiment of an electrochemical cell system 200 suitable for operation as an anode feed electrolysis cell, cathode feed electrolysis cell, fuel cell, or regenerative fuel cell is schematically shown. Cell system 200 is typically one of a plurality of cells employed in a cell stack as part of an electrochemical cell system. When cell system 200 is used as an electrolysis cell, power inputs are generally between about 1.48 volts and about 3.0 volts, with current densities between about 50 A/ft$^2$ (amperes per square foot) and about 4,000 A/ft$^2$. When used as a fuel cell, power outputs range between about 0.4 volts and about 1 volt, and between about 0.1 A/ft$^2$ and about 10,000 A/ft$^2$. Power outputs may further exceed 10,000 A/ft$^2$. The number of cells within the stack, as well as the dimensions of the individual cells, is scalable to the cell power output and/or gas output requirements. Cell system 200 is capablel of being operated at cell pressures up to or exceeding about 100 pounds per square inch (psi), preferably about 500 psi, more preferably about 2,500 psi, or even more preferably about 10,000 psi.

Cell 200 includes a membrane 218 having a first electrode (e.g., an anode) 216 and a second electrode (e.g., a cathode) 214 disposed on opposite sides thereof. Flow fields 210, 220, which are in fluid communication with electrodes 214 and 216, respectively, are defined generally by the regions proximate to, and bounded on at least one side by, each electrode 214 and 216 respectively. A flow field member 228 may be disposed within flow field 220 between electrode 214 and, optionally, a pressure pad separator plate 222. A pressure pad 230 is typically disposed between pressure pad separator plate 222 and a cell separator plate 232. Cell separator plate 232, which is optional, is disposed adjacent to pressure pad 230. A frame 224 generally surrounds flow field 220. A gasket 226 may be optionally disposed between frame 224 and pressure pad separator plate 222 for enhancing the seal within the reaction chamber defined on one side of cell 200 by frame 224, pressure pad separator plate 222 and electrode 206. A gasket 236 may be disposed between pressure pad separator plate 222 and cell separator pad 232 enclosing pressure pad 230.

A flow field member 208 may be disposed in flow field 210 and surrounded by a fame 204. A cell separator plate 212 is disposed adjacent flow field member 208 opposite oxygen electrode 216, and a gasket 206 is disposed between frame 204 and cell separator plate 212, generally for enhancing the seal within the reaction chamber defined by frame 204, cell separator plate 212 and the oxygen side of membrane 218. The cell components, particularly cell separator plates 212, 232, frames 204, 224, and gaskets 206, 226, 236, are formed with the suitable manifolds or other conduits as is conventional.

Membrane 218 comprises electrolytes that are preferably solids or gels under the operating conditions of the electrochemical cell. Useful materials include proton conducting ionomers and ion exchange resins. Useful proton conducting ionomers include complexes comprising an alkali metal salt, alkali earth metal salt, a protonic acid, or a protonic acid salt. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene)glycol, poly(oxyethylene-co-oxypropylene)glycol monoether, and poly(oxyethylene-co-oxypropylene)glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol mono ethyl ether with methacrylic acid are known in the art to exhibit sufficient ionic conductivity to be useful.

Ion-exchange resins useful as proton conducting materials include hydrocarbon-containing and fluorocarbon-containing resins. Hydrocarbon-containing ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-containing ion-exchange resins can include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-containing resins having sulfonic, carboxylic and/or phosphoric acid functionality are preferred. Fluorocarbon-type resins typically exhibit excellent resistance to oxidation by halogen, strong acids, and bases. One family of fluorocarbon-containing resins having sulfonic acid group functionality is NAFION™ resins (commercially available from E. I. du Pont de Nemours and Company, Wilmington, Del.).

Flow field members 208, 228 allow the passage of system fluids, and preferably, are electrically conductive, and may be, for example, screen packs or bipolar plates. The screen packs include one or more layers of perforated sheets or a woven mesh formed from metal or strands. These screens typically comprise metals, for example, niobium, zirconium, tantalum, titanium, carbon steel, stainless steel, nickel, cobalt, and alloys thereof. Bipolar plates are commonly porous structures comprising fibrous carbon or fibrous carbon impregnated with polytetrafluoroethylene or PTFE (commercially available under the trade name TEFLON® from E. I. du Pont de Nemours and Company).

Pressure pad 230 provides even compression between cell components, is electrically conductive, and therefore generally comprises a resilient member, preferably an elastomeric material, together with a conductive material. Suitable elastomeric materials include, but are not limited to, silicones, such as, for example, fluorosilicones; fluoroelastomers, such as KALREZ® (commercially available from E. I. du Pont de Nemours and Company), VITON® (commercially available from E. I. du Pont de Nemours and Company), and FLUOREL® (commercially available from Minnesota Mining and Manufacturing Company, St Paul, Minn.); and combinations thereof. The electrically conductive material is preferably compatible with the system fluids and membrane 218. Suitable electrically conductive materials include, but are not limited to, conductive metals and alloys and superalloys thereof, for example zirconium; tantalum; titanium; niobium; iron and iron alloys, for examples steels such as stainless steel; nickel and nickel alloys such as HASTELLOY™ (commercially available from Haynes International, Kokomo, Ind.); cobalt and cobalt superalloys such as ELGILOY™ (commercially available from Elgiloy® Limited Partnership, Elgin, Ill.) and MP35N™ (commercially available from Maryland Specialty Wire, Inc., Rye, N.Y.); hafnium; and tungsten, among others, with titanium being preferred. Conductive carbon is also often used. In one embodiment, the electrically conductive material comprises a plurality of VITON® cords woven or stitched into a conductive carbon cloth substrate. Pressure pad 230 is optionally porous to allow passage of water or system gases.

Electrodes 214 and 216 may be adhesively disposed on membrane 218, or may be positioned adjacent to, but in contact with, membrane 218. At least one of the electrodes 214, 216 (and preferably both electrodes 214, 216) comprises a catalyst disposed on a support.

The catalyst provides active electrocatalytic sites for the reaction, for example, by electrolyzing water and producing hydrogen, and breaking down hydrogen into hydrogen ions. Suitable catalysts include, but are not limited to, platinum, palladium, rhodium, carbon, gold, tantalum, tungsten, ruthenium, iridium, osmium, mixtures comprising at least one of the foregoing catalysts, and alloys comprising at least one of the foregoing catalysts, and the like, with platinum or palladium preferred. While certain catalysts are specifically listed, it is contemplated that other catalysts capable of electrolyzing water and producing hydrogen (in the case of electrolysis cell operation) and/or capable of breaking down hydrogen into ions (in the case of fuel cell operation) are also suitable for use in an electrochemical cell environment.

The support material is non-oxidizable under electrochemical cell operating conditions. Such operating conditions are at anodic potentials of less than about 4 volts (V), preferably less than about 3 V, and most preferably greater than about 1.5 V to less than about 4 V. Suitable support materials accordingly include electrically conductive materials compatible with the electrochemical cell environment (i.e., the desired pressure differential, preferably up to or exceeding about 2,500 psi, temperatures up to about 250° C., and exposure to hydrogen, oxygen, and water). In one embodiment, the support material has a resistivity of less than about 5.48 microohm-centimeter ("microohm-cm"), preferably less than about 270 microohm-cm.

Suitable support materials include, but are not limited to, stable oxides such as a metal oxide selected from the group consisting of aluminum oxide, zirconium oxide, titanium oxide, tungsten oxide; carbides such as silicon carbide; nitrides such as titanium nitride, stable carbon compositions such as diamond; as well as materials including carbon (e.g., carbon steel), conductive metals and alloys and superalloys thereof, for example zirconium; tantalum; titanium; niobium; iron and iron alloys, for examples steels such as stainless steel; nickel and nickel alloys such as HASTELLOY™ (commercially available from Haynes International, Kokomo, Ind.); cobalt and cobalt superalloys such as ELGILOY™ (commercially available from Elgiloy® Limited Partnership, Elgin, Ill.) and MP35™ (commercially available from Maryland Specialty Wire, Inc., Rye, N.Y.); hafnium; and tungsten, Inconel® (commercially available from INCO Alloys International Inc., Huntington, W. Va.) among others), among others.

A proton conductive material can optionally be incorporated with the catalyst and support. The proton conductive material provides a proton "bridge" communicating protons between the catalyst material and the electrochemical cell membrane. The proton conductive material is preferably solid or gel-like under the operating conditions of the electrochemical cell, and can be selected from among those employed for forming the membrane in electrochemical cells as described above. Preferred materials include, but are not limited to, homogeneous perfluoroionomers, polyolefin, poly(vinylidene fluoride) or polytetrafluoroethylene ionomer composites, sulfonated aromatic polyether ether ketones, sulfonated styrene-based polymers, copolymers of sulfonated styrene-based polymers crosslinked with aromatic monomers such as divinyl benzene, and mixtures comprising at least one of the foregoing proton conductive materials.

In one method of forming the electrode, a particulate catalyst material and a particulate support material are mixed, e.g., in a milling operation. The mixture can then be formed into the desired electrode shape, by casting or screen printing, for example. Depending on the particular support material and catalyst, the support material may first be sintered at elevated temperatures and/or pressures as required. For example, zirconium oxide may be cold pressed under pressure or sintered at temperatures from about 4710° F. to about 4750° F. to form a suitable support for the catalyst material. Alternatively, aluminum oxide may be sintered at temperatures from about 3700° F. to about 3750° F. to form a suitable support for the catalyst material. The sintered zirconium oxide or aluminum oxide support material are then be mixed with the catalyst material. As still another alternative, a mixture of the particulate catalyst and support material may be sintered at elevated temperatures and/or pressures, for example a predominantly solid zirconium oxide/catalyst mixture may be sintered at temperatures up to about 500° F. A predominantly liquid mixture (e.g., in solution, suspension, softened, or melted) of both the catalyst and support materials can be prepared and cast or melt extruded to form a layer for use as an electrode.

In another method of forming the electrode, the support can be preformed from a particulate or solid material, and then integrated with the catalyst. For example, a particulate support material can be compacted into the desired electrode configuration (by application of pressure under vacuum, e.g., or by sintering), and then coated or infiltrated with catalyst material. The catalyst can be provided as a liquid phase, e.g., an ink, and coating or infiltrating can be by painting, dipping, imbibing, or the like. This construction can then be sintered.

Figure 4:
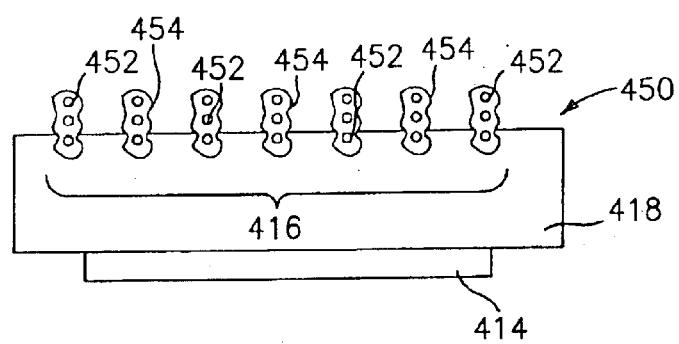
FIG. 4 is a cross-sectional, schematic diagram of a membrane electrode assembly.
Figure 5:
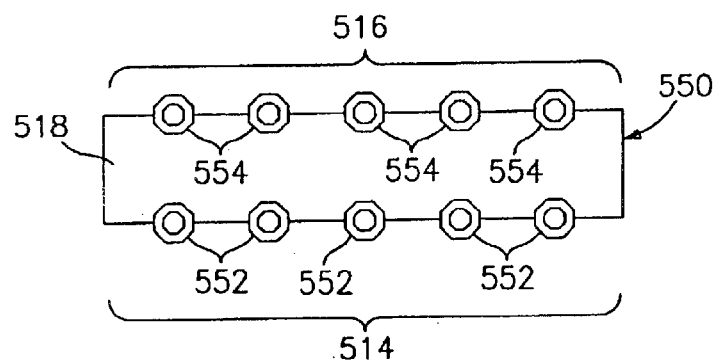
FIG. 5 is a cross-sectional, schematic diagram of another embodiment of a membrane electrode assembly.

Alternatively, the support can be in the form of a felt, mesh, or weave, or other porous shape, and then coated with the catalyst material by painting, dipping, imbibing, or the like. As shown in FIG. 4, this construction can then be pressed into a proton exchange membrane, wherein membrane electrode assembly 450 comprises a first electrode 416 pressed into a membrane 418, electrode 416 comprising a support material 452 (in the form of three layers of a mesh) coated with a catalyst material 454, and a second electrode 414. In an alternative embodiment shown in FIG. 5, a membrane electrode assembly 550 comprises a membrane 518 having embedded therein first and second electrodes 514, 516, each comprising support material 552 (in the form of a single layer of a mesh) coated with catalyst material 554. When the support is preformed, is has sufficient void volume to allow integration of the catalyst and incorporation into the proton exchange membrane, e.g. greater than about 20%, with greater than about 40% porosity preferred, with about 20% to about 80% more preferred, and about 40% to about 70% especially preferred.

Figure 3:
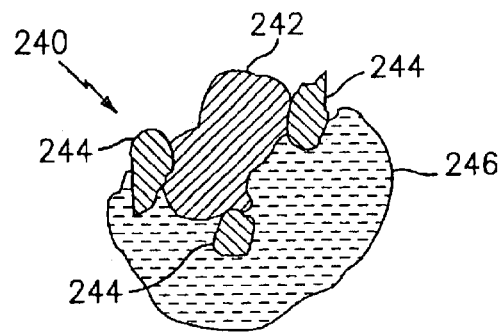
FIG. 3 is an enlarged partial sectional view of an electrode for use in an electrochemical cell.

A proton conductive material can optionally be integrated with the catalyst and support. For example, milled particles can be coated with a solution or suspension of a proton exchange material, and then these particles pressed, cast or screen printed. The catalyst material, support material, and proton conductive material can be milled together to form electrode particles, which are then pressed, cast, or screen printed to form the electrode. As shown in FIG. 3, electrode particle 240 comprises a support material 242 supporting plurality of catalyst particles 244. Alternatively, the catalyst particles 244 can be evenly coated onto the support material 242. A quantity of proton conductive material 246 is dispersed generally around the support material 242 and the catalyst particles 244. In another method the proton exchange material can be mixed with the catalyst material and then applied to a preformed support material as described above. These same techniques can also be used to apply the proton exchange material to a preformed catalyst/support element.

The support material should have a sufficient surface area to facilitate the desired loading of catalyst material, e.g., greater than about 25 meters$^2$/gram ($m^2$/g), and preferably greater than about 50 $m^2$/g. The size and geometry of the support are dependent upon the specific operating condition and application. For example, if a conventional screen pack or bipolar plate is not used, the thickness of the support will be greater than in a system that will also employ a screen pack. The support thickness is thus based upon conditions such as whether a flow field member such as a screen pack or bipolar plate is used, the opening size in the flow field member pressure applied across the membrane, operating conditions, support material composition and form (e.g., fiber (random, woven, non-woven, chopped, continuous, and the like), particle, preform, combination thereof or others), and porosity and strength of the support. Typically, for pressures up to about 2,000 psi and using a 310 screen, e.g., comprising multiple layers of screen material formed from 0.005 inches (0.127 mm) to 0.010 inches (0.254 mm) thick metal strands having pattern openings of 0.125 inches (3.17 mm) by 0.053 inches (1.35 mm) to 0.071 inches (1.80 mm), the support can have a thickness of up to about or greater than 40 mil, with about 5 to about 20 mils more preferred, and about 8 to about 12 mils especially preferred.

Due to the three dimensional nature of the support, the electrode can have a lower catalyst loading than conventional electrodes with a substantially similar reactivity. For example, although catalyst loadings exceeding about 10 milligrams per square centimeter (mg/cm$^2$) can be used, loadings of less than about 2 mg/cm$^2$ are preferred, with loadings of about 0.01 mg/cm$^2$ to about 1 mg/cm$^2$ especially preferred. In contrast, to obtain a similar reactivity, typical conventional electrodes required a catalyst loading of about 5 mg/cm$^2$ or greater.

Suitable relative quantities of support material, catalyst material, and optional proton conductive material are readily determined by one of ordinary skill in the art, depending on the required activity of the electrode, the cost of the catalyst, the conductivity of the support material, the surface area of the support material, size of the support and/or catalyst material particles, and other considerations. For example, in one embodiment the electrode can comprise about 2 to about 5 weight percent (wt. %) of support material, about 85 to about 90 wt. % of catalyst material, and about 5 to about 10 wt. % of proton conductive material based on the total weight of the electrode. Preferably, the electrode comprises about 5 to about 10 wt. % of support material, about 85 to about 90 wt. % catalyst material, and about 5 to about 10 wt.

% proton conductive material based on the total weight of the electrode. In another embodiment, the electrode comprises from about 5 to about 95 weight percent (wt. %) of support material, from about 5 to about 95 wt. % catalyst, and from about 1 to about 50 wt. % proton conductive material based on the total weight of the electrode. Preferably, the electrode comprises from about 20 to about 80 wt. % of support material, from about 20 to about 80 wt. % catalyst material, and from about 5 to about 25 wt. % proton conductive material based on the total weight of the electrode.

The shape of the electrodes so formed is not critical, and is dictated by the type of electrochemical cell and cell requirements. Generally, the electrodes are in the form of a thin film having a thickness, the thickness generally being from about 0.000025 inches to about 0.001 inches. Such electrodes are essentially non-oxidizable under the conditions found in electrochemical cells, e.g., high or low pressures. The electrodes provide uniform conductivity, and lower the overall cost of the electrochemical cell due to the addition of the non-oxidizable support material that effectively reduces the quantities of precious metals.

The following example is provided to illustrate the process and apparatus according to the embodiment disclosed. It should be understood that the examples are given for the purpose of illustration and do not limit the invention.

EXAMPLE

A 0.010 inch thick sintered titanium plate having approximately 80% porosity is treated with a catalyst ink and binder comprising 3.7 weight percent (wt %) oxygen catalyst (as disclosed in U.S. Pat. No. 3,992,271) 12.1 wt % of 5 wt % solution NAFION®, and 84.2 wt % deionized water. The porous plate is soaked in acetone then placed in the boiling ink solution at 100° C. The acetone is vaporized in the solution while the catalyst and binder remain imbibed into the porous titanium creating a porous electrode. The porous electrode was then heated to 180° C. in an oven to activate the catalyst binder to the ink thereby attaching the catalyst to the pores within the porous electrode. This process was repeated until a catalyst loading of 0.8 mg/cm$^2$ is achieved. The electrode is then pressed into a membrane.

The above-described electrodes and membrane electrode assemblies provide uniform conductivity, lower resistance, and lower the overall cost of the electrochemical cell due to the addition of support material that effectively reduces the quantities of precious metals and/or the need for screen packs, bipolar plates, and the like. The cells may be operated at higher differential pressures. The electrode possesses several advantages such as non-oxidizing property, surface area, and improved resistivity over electrodes employing oxidizable support material. The electrode composition, unlike particulate carbon, is non-oxidizable at high anodic potentials such as greater than about 1.5 volts, exhibits improved resistivity, and possesses similar surface area values. Electrochemical cells employing such electrodes benefit from these advantages through improved durability, improved lifespan and usefulness, reduced maintenance and associated labor and costs, and the like.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electrode for use in an electrochemical cell system, comprising, based on the total weight of the electrode:

about 5 to about 95 wt. % of a support that is non-oxidizable at anodic potentials of greater than about 1.5 to less than about 4 volts, wherein the support material comprises diamond;

about 5 to about 95 wt. % of a catalyst integrated with the support; and up to about 50 wt. % of a proton conductive material integrated with the catalyst.

2. The electrode as in claim 1, comprising about 5 to about 15 wt. % of the support, about 85 to about 90 wt. % of the catalyst, and up to about 15 wt. % of the proton conductive material.

3. The electronic as in claim 2, comprising about 5 to about 10 wt. % of the support, about 85 to about 90 wt. % of the catalyst, and about 5 to about 10 wt. % of the proton conductive material.

4. The electrode as in claim 1, comprising about 20 to about 80 wt. % of the support, about 20 to about 80 wt. % of the catalyst, about 5 to about 25 wt. % of the proton, conductive material.

5. The electrode as in claim 1, wherein the proton conductive material is selected from the group consisting of proton conducting ionomers and ion exchange resins.

6. The electrode as in claim 5, wherein the proton conducting ionomer comprises a complex of an alkali metal, an earth metal salt, or a protonic acid, and one or more polar polymers selected from the group consisting of polyether, polyesters, and polyimides.

7. The electrode as in claim 5, wherein the proton conducting ionomer comprises a complex of an alkali metal, an alkaline earth metal salt or a protonic acid and a network or crosslinked polar polymers selected from the group consisting of polyethers, polyesters and polyimides.

8. The electrode as in claim 5, wherein the ion exchange resin comprises a sulfonated hydrocarbon ion exchange resin or a sulfonated fluorocarbon ion exchange resin.

9. The electrode as in claim 1, wherein the support material is non-oxidizable at anodic potentials less than about 3 V.

10. The electrode as in claim 1, wherein the support material has a resistivity of less than about 270 microohm-centimeter.

11. The electrode as in claim 1, wherein the support material has a surface area of greater than about 25 meters$^2$/gram.

12. The electrode as in claim 1, wherein the catalyst material is selected from the group consisting of platinum, palladium, rhodium, carbon, gold, tantalum, tungsten, ruthenium, iridium, osmium, mixtures comprising at least one of the foregoing catalyst materials, and alloys comprising at least one of the foregoing catalyst materials.

13. The electrode as in claim 1, wherein the support material is in a particulate form.

* * * * *